United States Patent [19]

Southwell

[11] Patent Number: 5,144,484
[45] Date of Patent: Sep. 1, 1992

[54] BINARY OPTIC LENS DESIGN USING FLIP-FLOP OPTIMIZATION

[75] Inventor: William H. Southwell, Thousand Oaks, Calif.

[73] Assignee: Rockwell International Corporation, Seal Beach, Calif.

[21] Appl. No.: 597,934

[22] Filed: Oct. 15, 1990

[51] Int. Cl.⁵ .......................... G02B 3/00; G02B 9/00
[52] U.S. Cl. .................................... 359/565; 359/589; 359/900
[58] Field of Search ............... 359/565, 589, 900, 558

[56] References Cited

U.S. PATENT DOCUMENTS 4,637,697  1/1987  Freeman ........................ 359/565
4,666,250  5/1987  Southwell ...................... 350/166

OTHER PUBLICATIONS

Phase plate lens for a multiple image lens System, Genovese et al; IBM Technical disclosure bulletin, vol. 8 No. 12 May 1966.

*Primary Examiner*—Paul M. Dzierzynski
*Assistant Examiner*—Hung Xuan Dang
*Attorney, Agent, or Firm*—John J. Deinken

[57] ABSTRACT

A binary optic lens is designed to achieve a predetermined effect on light propagating through the lens by specifying an initial lens design with a plurality of discontinuous subaperture regions, assigning each subaperture region a relative phase difference of 0 or $\pi$, and calculating the net intensity of light propagating through the lens by coherently summing the wave amplitudes for all of the subaperture regions at a given point in the image plane of the lens. The assigned phase difference for one of the subaperture regions is then changed and the intensity is recalculated by coherently summing the wave amplitudes for all of the subaperture regions at the given point. If the intensity increases over the previously calculated intensity, the changed phase difference is assigned to the selected subaperture region. The steps of changing, recalculating, and assigning are repeated for all of the subaperture regions to make one complete pass through the lens. The entire process is repeated until the calculated intensity no longer increases.

6 Claims, 12 Drawing Sheets

BINARY OPTIC LENS DESIGN USING FLIP-FLOP OPTIMIZATION

BACKGROUND OF THE INVENTION

This invention is concerned with the design of binary optical lenses.

The modulation of an optical wavefront by a surface relief pattern has the remarkable capability of generating an arbitrary image from a single incident plane wave. One example of such modulation in the prior art is a binary phase-only filter for optical correlation, where the phase relief pattern was generated by taking the Fourier transform of a given image (Flavin, et al., Correlation Experiments with a Binary Phase-Only Filter Implemented on a Quartz Substrate, Optical Engineering, Volume 28, Pages 470-473 (1989). Another example involved the generation of an array of equal spots for optical computing devices, with the relief pattern generated using a Monte Carlo type iterative method, known as simulated annealing, to arrive at a pattern which would generate an array of spots (Feldman, et al., Iterative Encoding of High-Efficiency Holograms for Generation of Spot Arrays, Optics Letters, Volume 14, Pages 479-481 (1989). Unlike a conventional optical surface, whose profile is characterized by only a few variables, a binary optical surface consists of a large number of discontinuous subaperture regions. The desired optical effect of a lens is achieved by virtue of imposing a difference in phase of $\pi$ radians between adjacent regions of the binary lens. The resulting interference effects between light passing through the various regions provides the means to produce a lens.

Because of the large number of subaperture regions which must be analyzed in designing a binary optical lens, conventional ray tracing design techniques are cumbersome for binary optical design and may not achieve an optimal solution in any event. Thus it would be desirable to provide an alternative technique for generating an arbitrary intensity pattern resulting from down-field propagation of a plane wave incident on a binary phase relief pattern.

SUMMARY OF THE INVENTION

A method of designing a binary optic lens to achieve a predetermined effect on light propagating through the lens includes the steps of specifying an initial lens design with a plurality of discontinuous subaperture regions, assigning each subaperture region a relative phase difference of 0 or $\pi$, and calculating the net intensity of light propagating through the lens by coherently summing the wave amplitudes for all of the subaperture regions at a given point in the image plane of the lens. The assigned phase difference for one of the subaperture regions is then changed and the intensity is recalculated by coherently summing the wave amplitudes for all of the subaperture regions at the given point. If the intensity increases over the previously calculated intensity, the changed phase difference is assigned to the selected subaperture region. The steps of changing, recalculating, and assigning are repeated for all of the subaperture regions to make one complete pass through the lens. The entire process is repeated until the calculated intensity no longer increases.

In more particular embodiments, the step of assigning each subaperture region a relative phase difference of 0 or $\pi$ may involve assigning each subaperture region a relative phase difference of 0, $\pi$, opposite that of the adjacent subaperture regions, or a relative phase difference of 0 or $\pi$ at random.

In another refinement, the steps of changing, recalculating, assigning, and repeating are repeated until the calculated intensity converges.

DESCRIPTION OF THE INVENTION

It is an outstanding feature of this invention to provide a new technique for generating a binary optical lens design. The inventive approach utilizes a merit function which is defined to be the intensity calculated by taking the coherent sum of the wave amplitudes from each subaperture of the binary lens. Each term in this sum is assigned a plus or a minus sign depending on whether that subelement is initially designated to have a zero or $\pi$ radians phase. Starting with some distribution of minus signs (corresponding to $\pi$ phase difference regions) the intensity at a given point in the image plane is evaluated. Then, stepping through the binary optical surface, each term is changed in sign (i.e., is "flipped" from zero to $\pi$ radians phase, or vice versa) and the effect of this flip on the merit function (i.e., the focal plane intensity at the given point) is noted. If the change increases the value of the merit function, the change is retained. Otherwise, the term at that point is "flopped", i.e., returned to its former state. Each succeeding term is then considered, by flipping its sign and evaluating the merit function. One pass is completed when all terms have been so examined.

Figure 1:
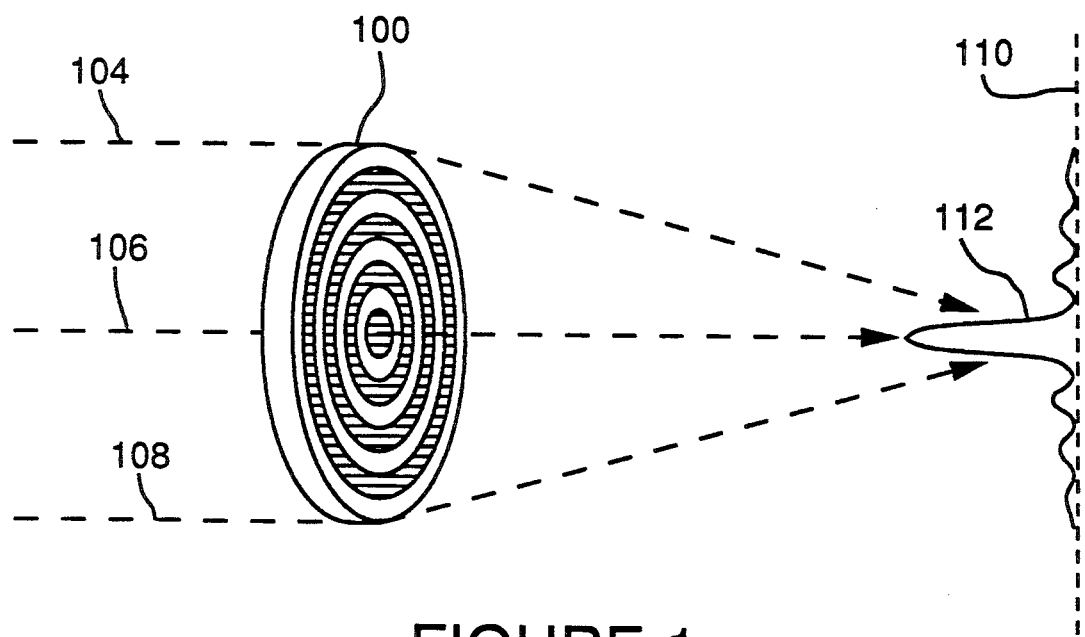
FIG. 1 is a schematic representation illustrating the operation of a binary lens.

FIG. 1 is a schematic representation illustrating the operation of a binary lens. The binary lens 100 consists of an optical material which is divided into multiple subelements, as indicated by the alternately shaded subelements. A plane wave, represented by the rays 104, 106, and 108, will be diffracted by the lens because the subelements have relative thicknesses designed to impose a difference of one half wavelength in the phase of the portions of the plane wave passing through adjacent subelements of the lens. In this manner, the plane wave, after passing through the lens, illuminates an image plane 110 with some nonuniform intensity pattern 112.

Figure 2:
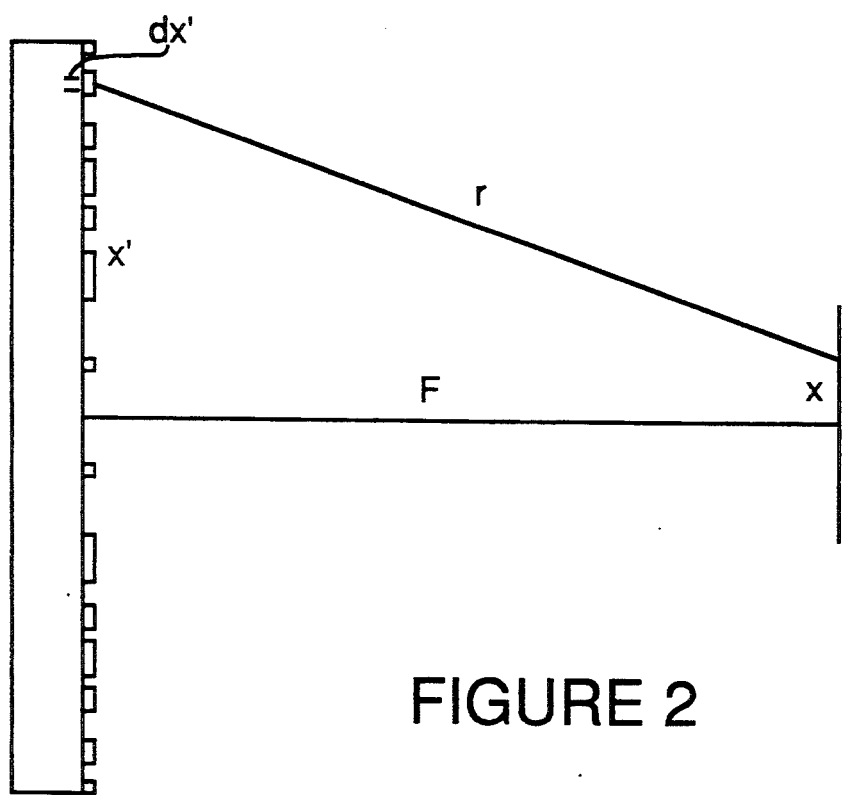
FIG. 2 is an illustration in schematic profile of a binary optical surface.

The design method of this invention begins by dividing an optical surface, such as the optical surface 200 illustrated in schematic profile in FIG. 2, into a large number of cells. A field point 214 a distance F from the optical surface and at a height x is selected and the field amplitude du is determined from a given cell in the optical surface $$du = \tau(x')e^{-i2\pi r/\lambda}dx' \qquad 1)$$

where x' is the position of the cell in the optical surface, t is the amplitude transmission function, and r is the distance from that cell to the field point at x $$r = \sqrt{F^2 + (x - x')^2} \qquad 2)$$

The total image field amplitude u(x) at the point x is a superposition of the incremental fields from all the cells in the optical surface $$u(x) = \sum_j \tau_j e^{-i2\pi r_j/\lambda} \qquad 3)$$

where $\tau_j$ is the amplitude transmission for the jth cell $$\tau_j = e^{i\phi_j} = \pm 1 \qquad 4)$$

where the transmission phase takes on the values of either 0 or $\pi$.

The field given by Equation 3) is complex, so its real and imaginary parts are computed separately $$u(x) = U + iV \qquad 5)$$

where $$U = \tau_j \cos(2\pi r_j/\lambda) \qquad 6)$$

$$V = -\tau_j \sin(2\pi r_j/\lambda) \qquad 7)$$

Since the arguments of the sine and cosine are fixed for any geometry and do not depend on any surface relief configuration, they may be pre-computed and stored in arrays. Thus the U and V are easily calculated by either adding or subtracting the jth cosine or sine term, depending on whether that cell has a zero or $\pi$ phase.

The intensity I at the point x is $$I = U^2 + V^2 \qquad 8)$$

The complete intensity in the field plane is determined by changing x and repeating the summations over the optical plane cells.

The intensity at the point x is the single number I given by Equation 8). In order to evaluate the intensity at that point if the phase on one cell were to change its state, it is not necessary to perform the complete sum over the optical surface. Instead, all that is required is to subtract from U and V that term corresponding to the cell that is changed and add the opposite state. Thus, to change the kth cell, $$U \to U - \tau_k \cos(2\pi r_k/\lambda) + (-\tau_k \cos(2\pi r_k/\lambda)) \qquad 9)$$

$$V \to V + \tau_k \sin(2\pi r_k/\lambda) - (-\tau_k \sin(2\pi r_k/\lambda)) \qquad 10)$$

With the new U and V the new intensity is easily evaluated by Equation 8).

The flip-flop optimization scheme for determining the two level binary phase surface consists of the following algorithm. From some starting point, such as, for example, all cells being set to zero phase, the intensity pattern is evaluated. The state of each cell is then changed separately and the intensity evaluated using the above approach. If the new intensity is closer to the desired intensity pattern, then the new state is retained, otherwise the old state is restored. All cells in the optical surface are likewise tested. This constitutes one pass. The process is repeated until a complete pass makes no more changes in the intensity pattern. At this point the optimization is complete.

In applying the technique of the invention to several specific lens designs, a unique solution has been found in three or four passes from a variety of starting distributions of phase. Unlike conventional lens design methods (such as CODE V), no derivatives are used and no ray tracing is performed. The merit function may be expanded to include off-axis image points by adding the intensity at focus for plane waves incident at given field angles. Another advantage of the inventive method is that it seems to find the globally best configuration for a given set of requirements.

Figure 3:
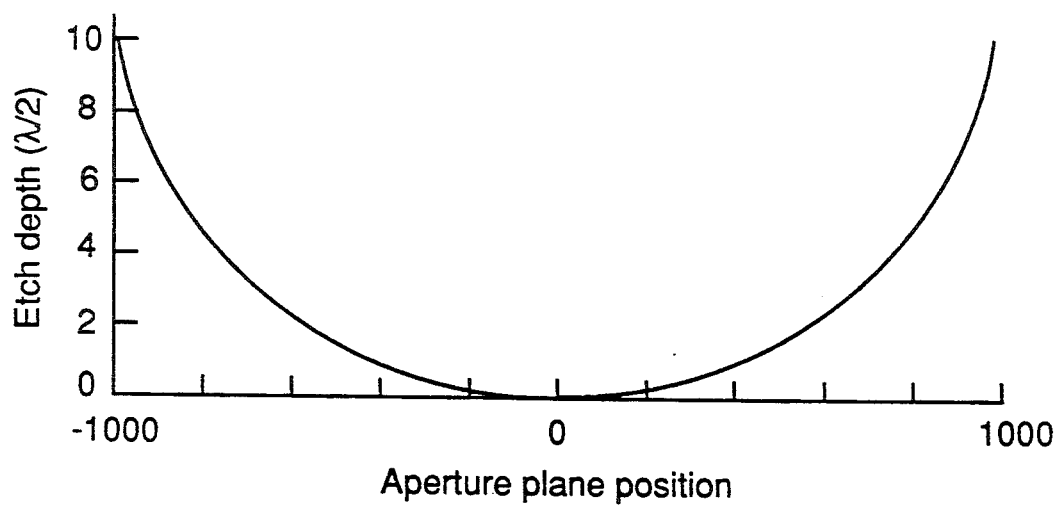
FIG. 3 is a plot of the aperture plane position versus etch depth for a classical lens.
Figure 4:
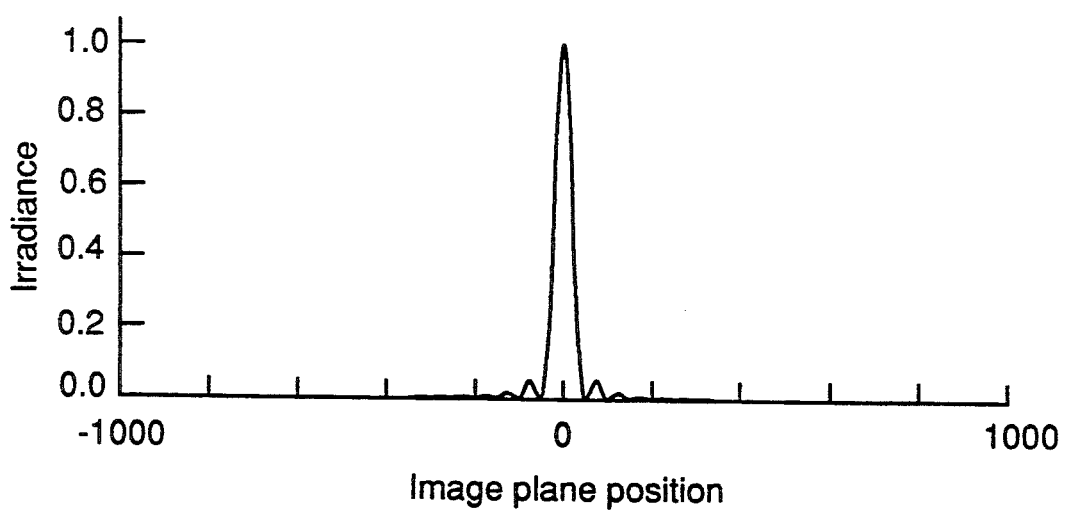
FIG. 4 is a plot of the calculated theoretical irradiance for the FIG. 3 lens on the vertical axis as a function of position on the image plane.
Figure 5:
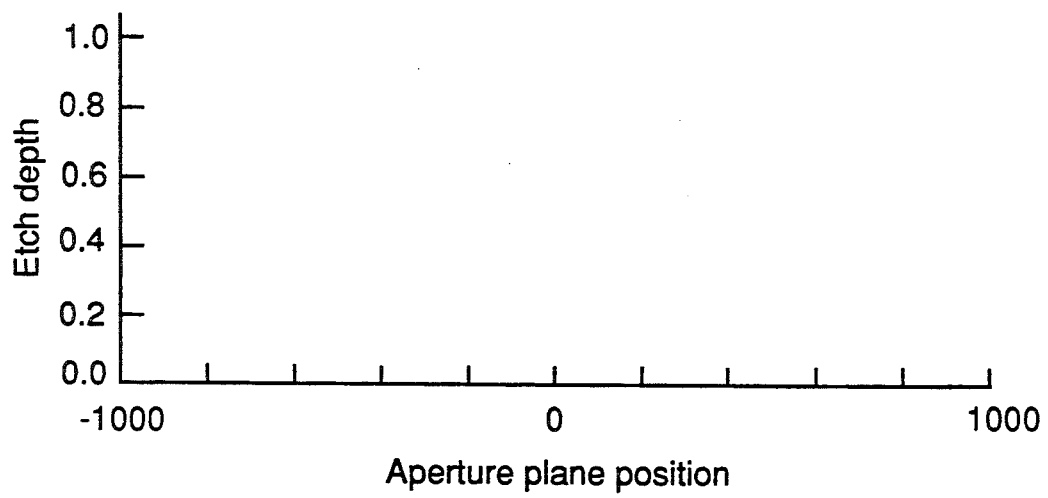
FIGS. 5, 7, 9, 11, 13, 15, 17, 19, and 21 are similar to FIG. 3, but are plots of the aperture plane position versus etch depth for various binary lens designs.
Figure 6:
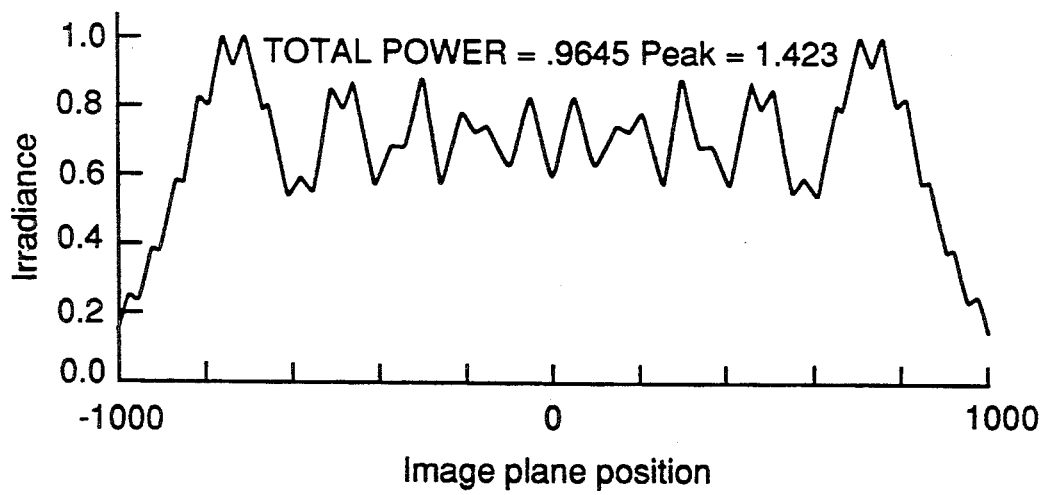
FIGS. 6, 8, 10, 12, 14, 16, 18, 20, and 22 are similar to FIG. 4, but are plots of the calculated irradiance for the respective lens designs depicted in FIGS. 5-21.
Figure 7:
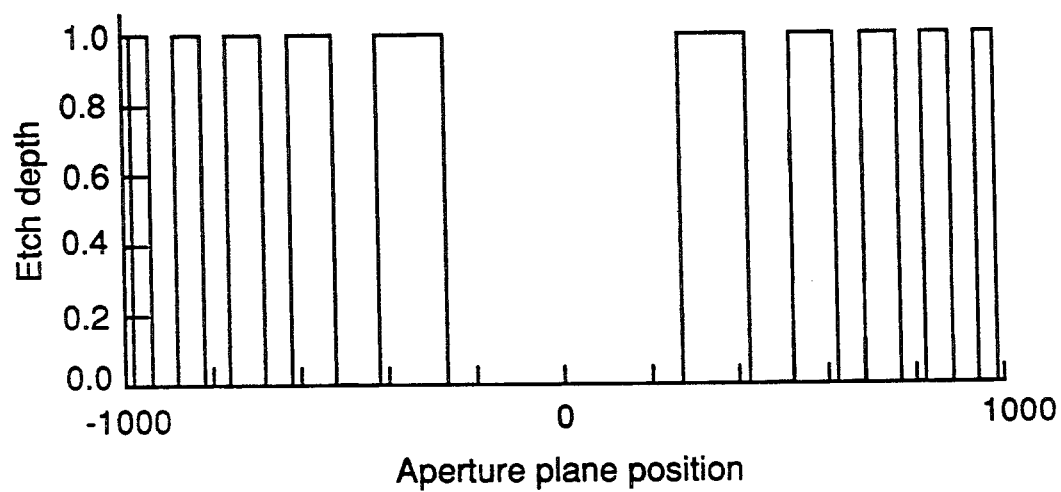
Figure 8:
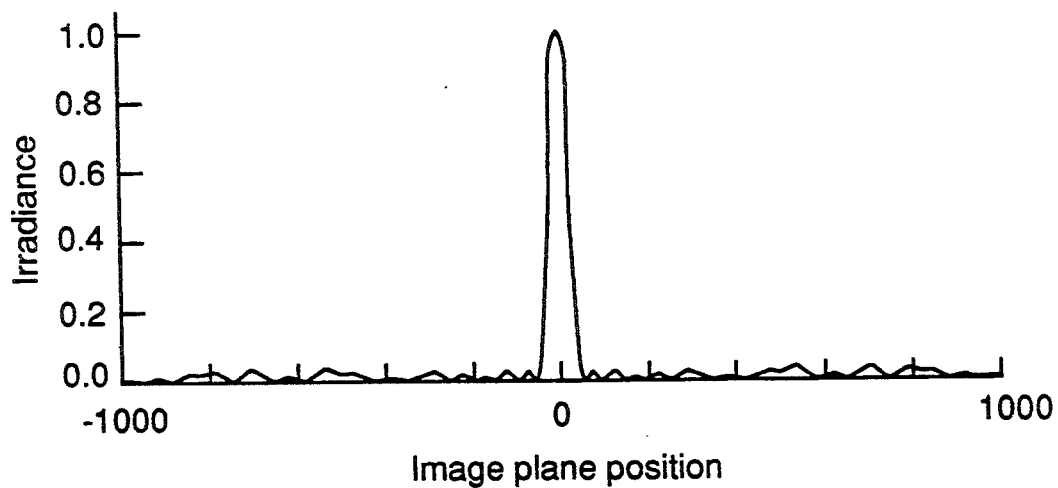
Figure 9:
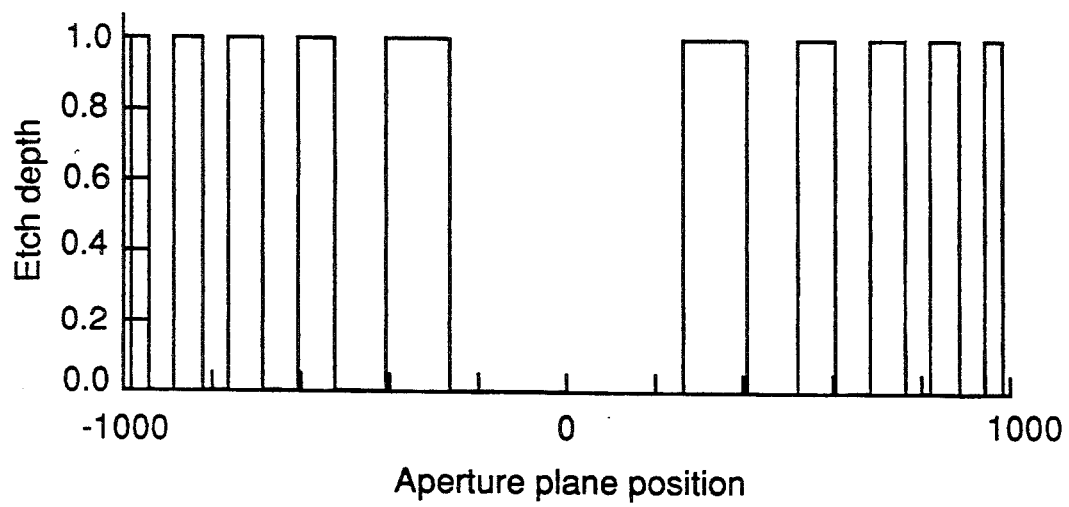
Figure 10:
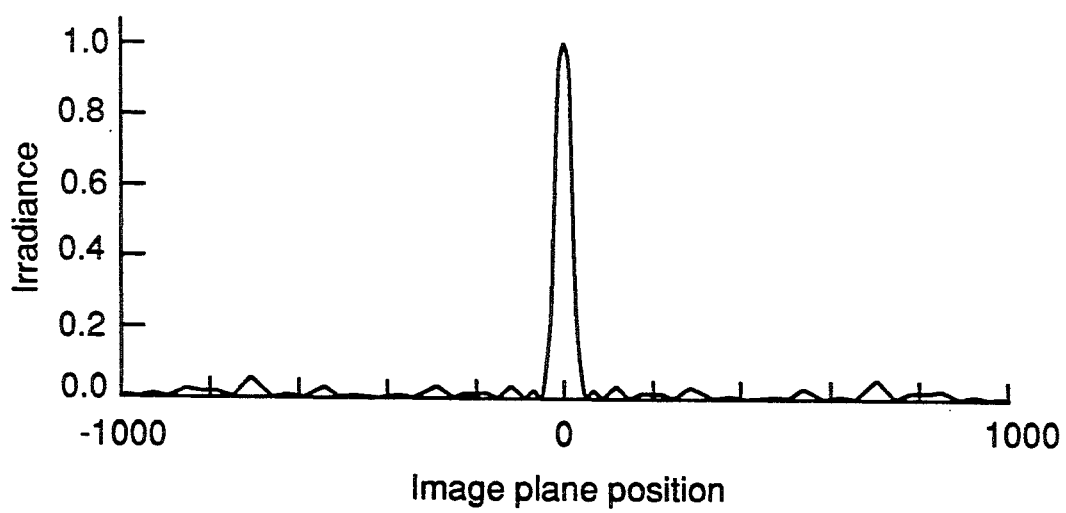
Figure 11:
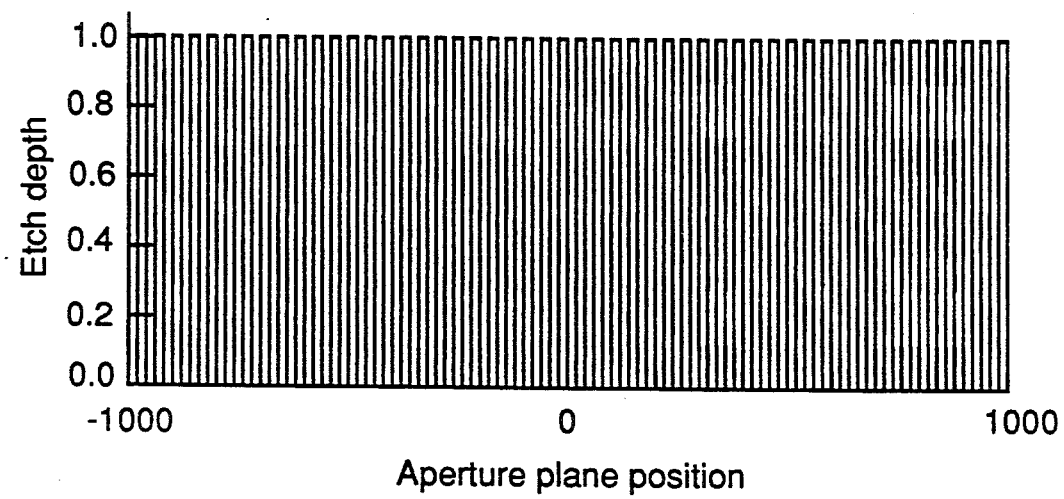
Figure 12:
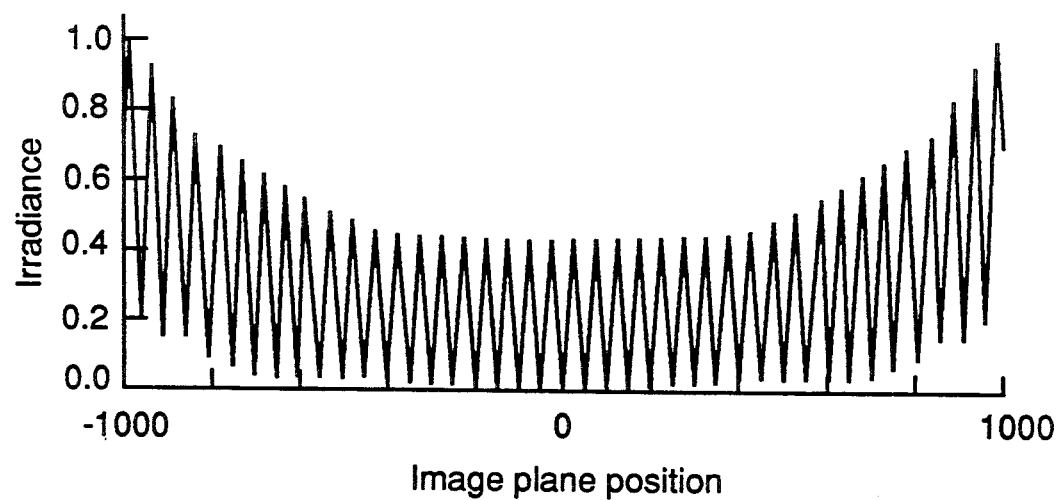
Figure 13:
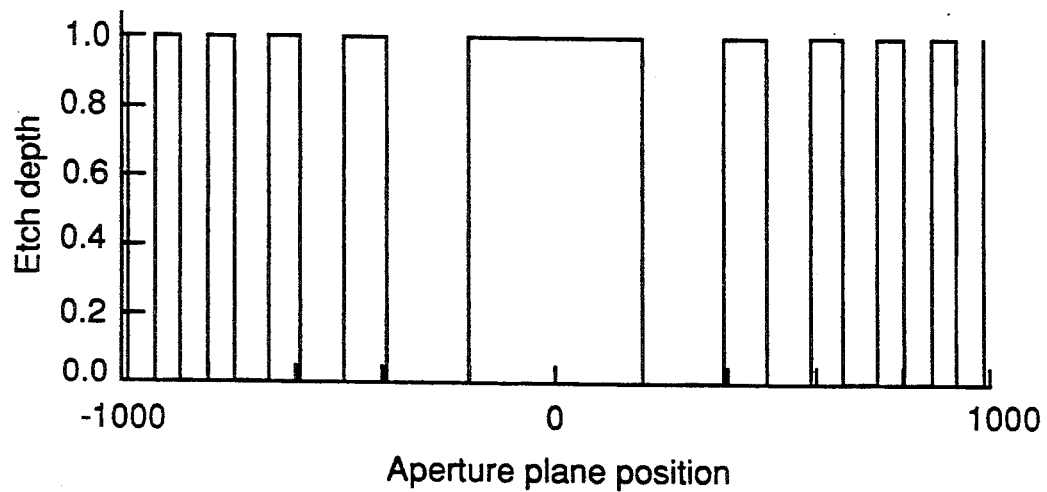

The power of the inventive technique may be illustrated by the improvement which can be achieved in diffraction efficiency. An illustrative classical lens is represented in FIGS. 3 and 4, where FIG. 3 is a plot of the aperture plane position versus the refractive depth of the lens and FIG. 4 is a plot of the calculated theoretical irradiance for the lens on the vertical axis as a function of position on the image plane. The efficiency for this lens is approximately 40%. If a corresponding binary optical structure is considered as being divided into 1,000 subapertures, and if initially all of the subapertures are considered to have the same phase (i.e., either 0 or $\pi$), the plot of the aperture plane position versus etch depth appears as in FIG. 5 and the calculated irradiance is plotted in FIG. 6. After a single pass through all of the subapertures of the design using the flip-flop optimization technique of the present invention, the binary optic profile depicted in FIG. 7 resulted, with a calculated irradiance as shown in FIG. 8. After only two passes of the flip-flop technique, the design converged, with a profile as indicated in FIG. 9 and the calculated irradiance shown in FIG. 10.

Figure 14:
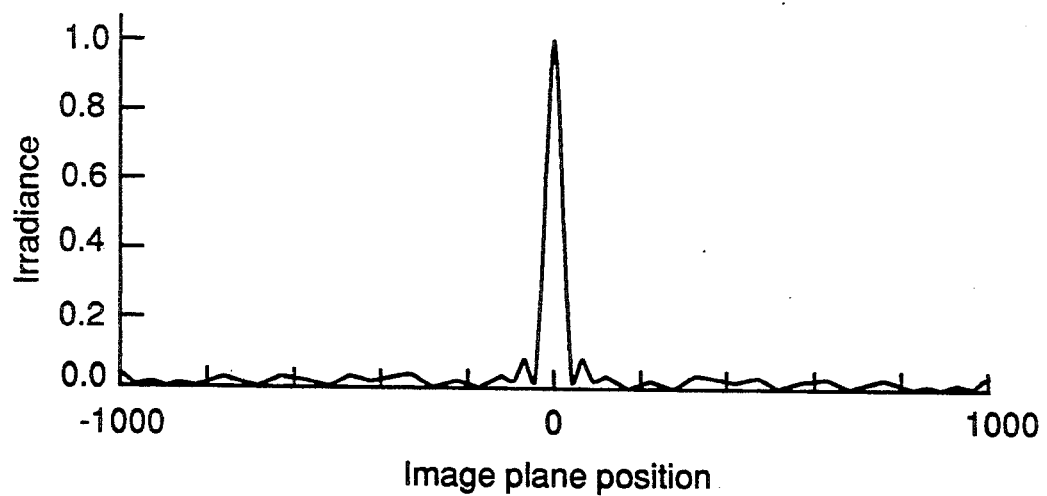
Figure 15:
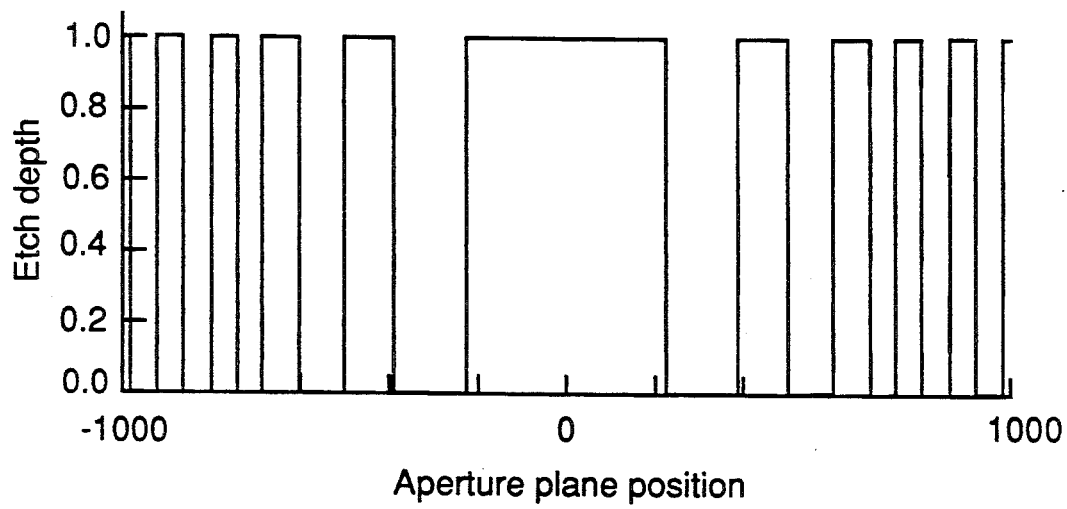
Figure 16:
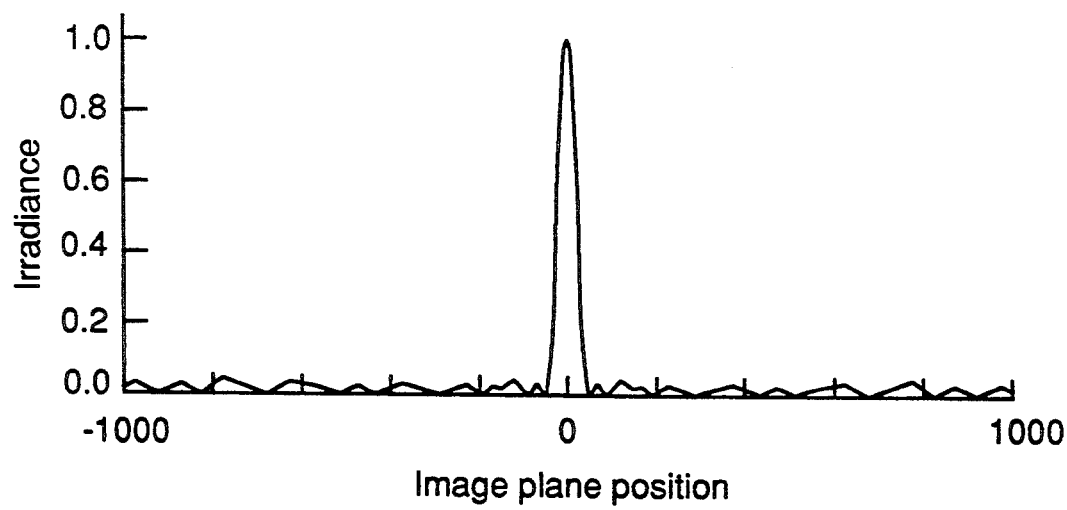

Another example of the power of the inventive technique is depicted in FIGS. 11-16. Here, the initial configuration, as shown in profile (FIG. 11) and calculated irradiance (FIG. 12), was for a binary lens with 1,000 subapertures of alternating phase. A single pass through the flip-flop optimization technique yielded the profile of FIG. 13, with an irradiance pattern as shown in FIG. 14. The flip-flop optimization technique converged after only three passes, with the resulting profile and irradiance of FIGS. 15 and 16.

Figure 17:
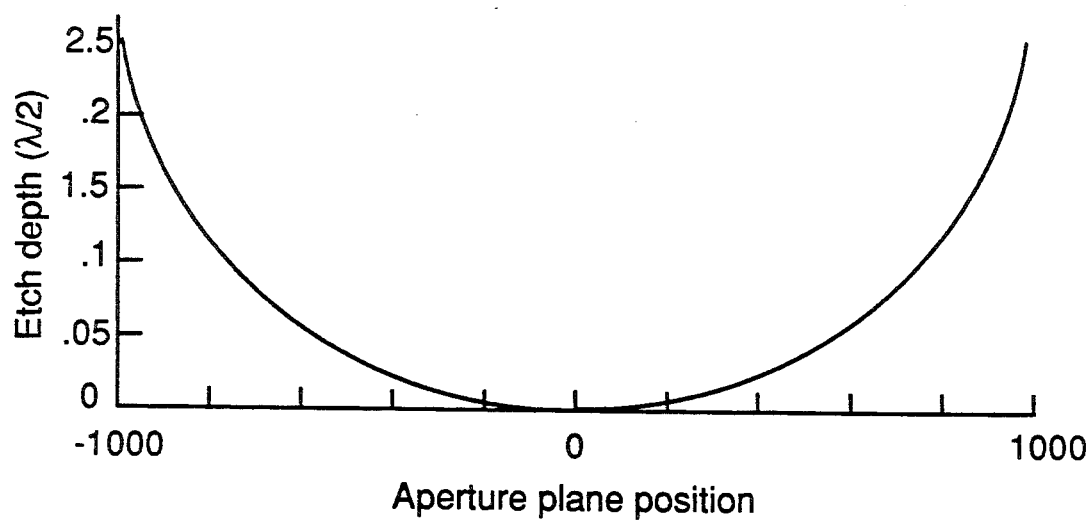
Figure 18:
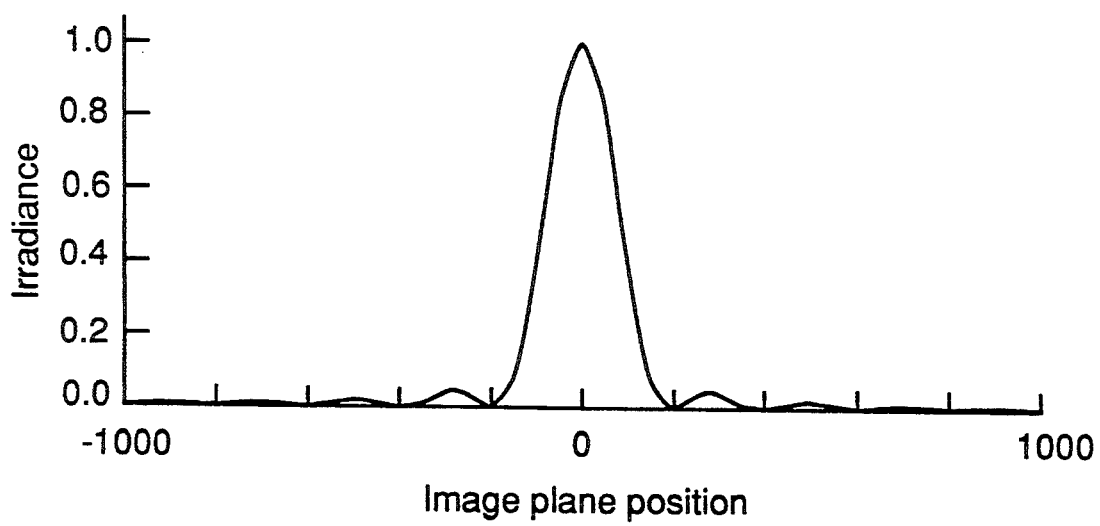
Figure 19:
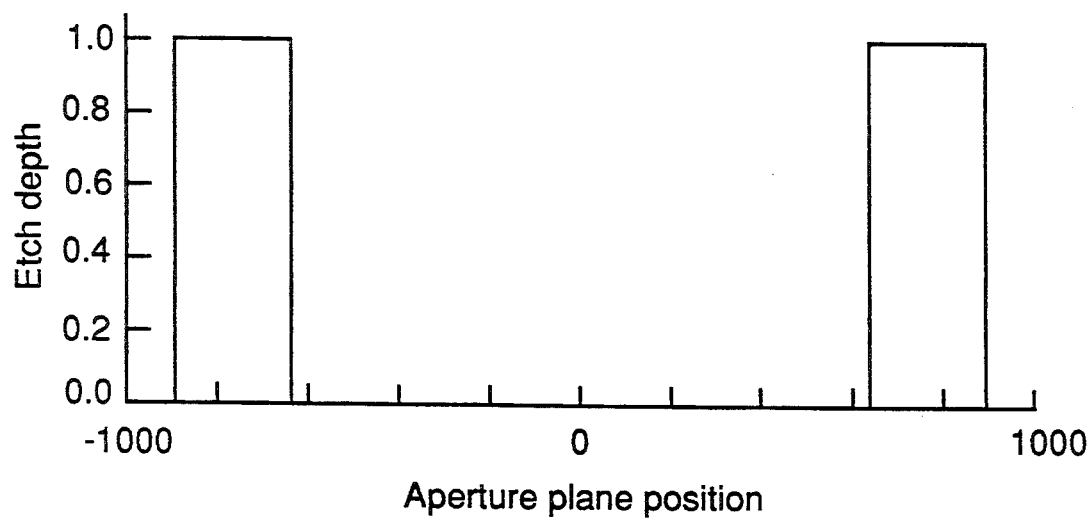
Figure 20:
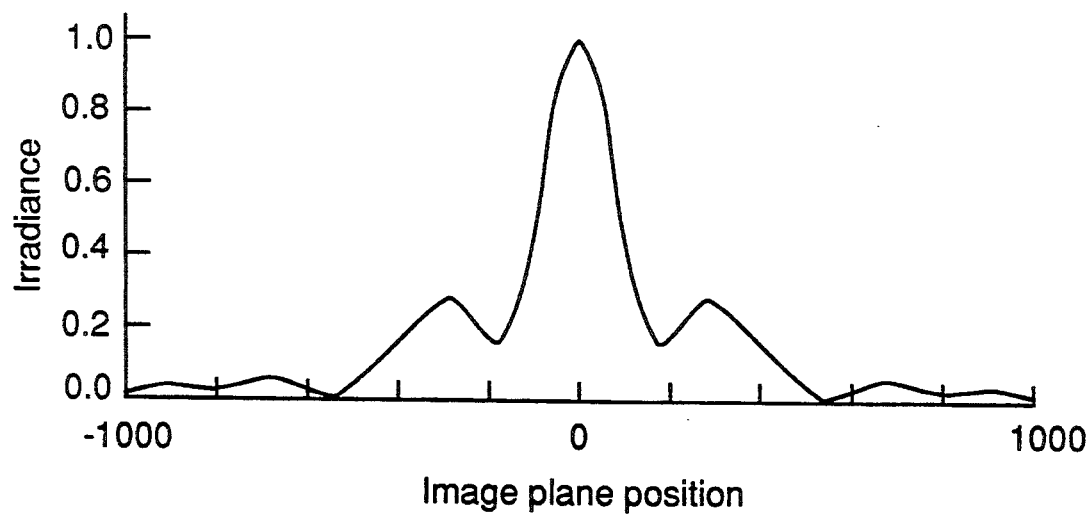
Figure 21:
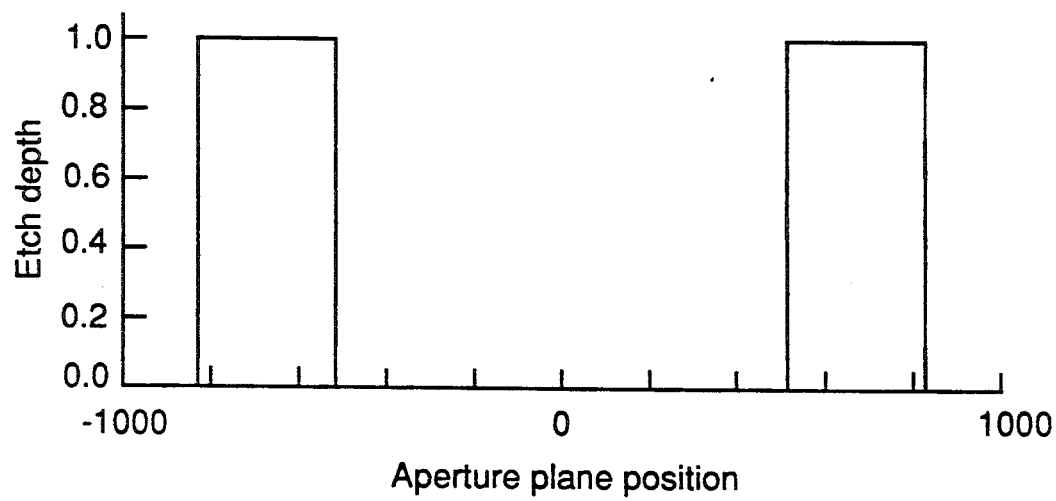
Figure 22:
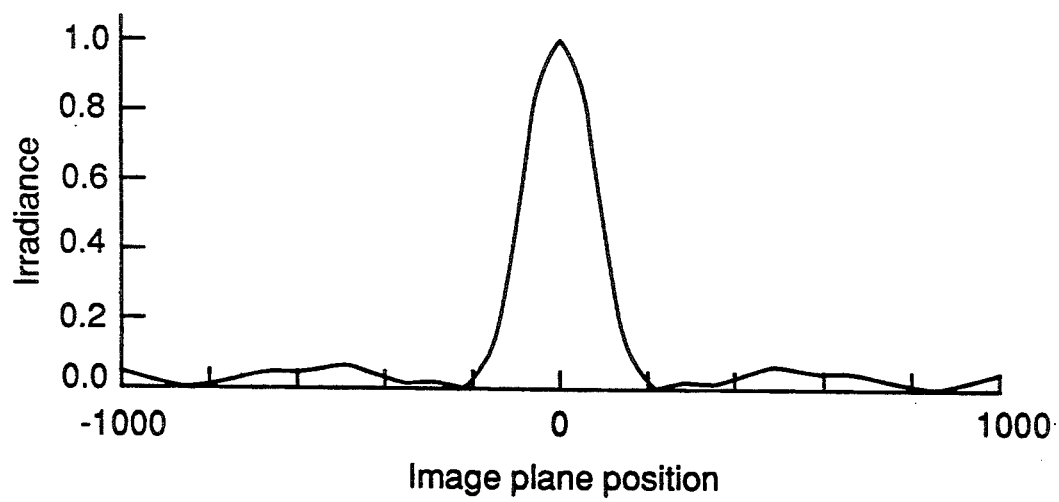

An additional illustration of the power of this invention compares the binary lens design which results with an analogous Fresnel lens. FIGS. 17 and 18 depict the profile and irradiance pattern for a classical lens, while FIG. 19 and 20 provide analogous information for a Fresnel lens, which exhibits a diffraction efficiency, as is well know, of approximately 41% relative to the classical lens. The flip-flop designed binary lens, however, as shown in FIGS. 21 and 22, exhibits a diffraction efficiency of approximately 54%. In addition, it can also be seen that the method of this invention produces an irradiance pattern with reduced side lobes.

In conclusion, the flip-flop optimization technique of this invention is a robust method which produces rapid convergence, with the final solution differing only slight even with widely different initial phase patterns for the subapertures of the lens. Surprisingly, binary lenses designed with this method exhibit higher diffraction efficiencies than two level binary optic Fresnel lenses.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

I claim:

1. A method of fabricating a binary optic lens to achieve a predetermined effect on light propagating through the lens, comprising the steps of:

specifying an initial lens design with a plurality of discontinuous subaperture regions in the lens;

assigning each subaperture region a relative phase difference of 0 or $\pi$;

calculating the net intensity of light propagating through the lens by coherently summing the wave amplitudes for all of the subaperture regions at a given point in the image plane of the lens;

changing the assigned phase difference for one of the subaperture regions;

recalculating the intensity by coherently summing the wave amplitude for all of the subaperture regions at the given point;

assigning the changed phase difference to the selected subaperture regions if the intensity increases over the previously calculated intensity;

repeating the steps of changing, recalculating, and assigning for all of the subaperture regions;

repeating the steps of changing, recalculating, assigning, and repeating until the calculated intensity no longer increases; and arranging the relative thicknesses of the subaperture regions in the lens such that each subaperture region having an assigned phase difference of $\pi$ introduces a phase difference of $\pi$ on light propagating through that subaperture region with respect to light propagating through each subaperture region having an assigned phase difference of 0.

2. The method of claim 1, wherein the step of assigning each subaperture region a relative phase difference of 0 or $\pi$ further comprises the step of assigning each subaperture region a relative phase difference of 0.

3. The method of claim 1, wherein the step of assigning each subaperture region a relative phase difference of 0 or $\pi$ further comprises the step of assigning each subaperture region a relative phase difference of $\pi$.

4. The method of claim 1, wherein the step of assigning each subaperture region a relative phase difference of 0 or $\pi$ further comprises the step of assigning each subaperture region a relative phase difference opposite that of the adjacent subaperture regions.

5. The method of claim 1, wherein the step of assigning each subaperture region a relative phase difference of 0 or $\pi$ further comprises the step of assigning each subaperture region a relative phase difference of 0 or $\pi$ at random.

6. the method of claim 1, wherein the step of repeating the steps of changing, recalculating, assigning, and repeating until the calculated intensity no longer increases further comprises repeating the steps of changing, recalculating, assigning, and repeating until the calculated intensity converges.

* * * * *